(12) United States Patent
Höfflinger et al.

(10) Patent No.: US 7,126,632 B2
(45) Date of Patent: Oct. 24, 2006

(54) METHOD AND APPARATUS FOR MODIFYING THE COLOR SATURATION OF ELECTRONICALLY ACQUIRED IMAGES

(75) Inventors: Bernd Höfflinger, Sindelfingen (DE); Heinz Gerhard Graf, Magstadt (DE)

(73) Assignee: Institut für Mikroelecktronik Stuttgart, Stuttgart (DE)

( * ) Notice: Subject to any disclaimer, the term of this patent is extended or adjusted under 35 U.S.C. 154(b) by 1008 days.

(21) Appl. No.: 10/192,304

(22) Filed: Jul. 10, 2002

(65) Prior Publication Data

US 2002/0176023 A1 Nov. 28, 2002

Related U.S. Application Data

(63) Continuation of application No. PCT/EP00/12571, filed on Dec. 12, 2000.

(30) Foreign Application Priority Data

Jan. 11, 2000 (DE) ............................. 100 00 779

(51) Int. Cl.
*H04N 5/202* (2006.01)
*H04N 9/68* (2006.01)
(52) U.S. Cl. ...................... 348/256; 348/234
(58) Field of Classification Search ............... 348/234, 348/256, 222.1, 235, 237, 254, 255, 645, 348/312; 382/254, 260, 276
See application file for complete search history.

(56) References Cited

U.S. PATENT DOCUMENTS

| | | | | |
|---|---|---|---|---|
| 3,272,916 A | * | 9/1966 | James et al. | 348/236 |
| 4,831,434 A | * | 5/1989 | Fuchsberger | 358/521 |
| 5,517,335 A | * | 5/1996 | Shu | 358/518 |
| 5,608,204 A | * | 3/1997 | Höfflinger et al. | 250/208.1 |
| 6,493,029 B1 | * | 12/2002 | Denyer et al. | 348/236 |
| 6,542,187 B1 | * | 4/2003 | Hamilton et al. | 348/234 |
| 2003/0025814 A1 | * | 2/2003 | Hunter et al. | 348/272 |
| 2003/0164884 A1 | * | 9/2003 | Morris et al. | 348/222.1 |

FOREIGN PATENT DOCUMENTS

| | | |
|---|---|---|
| DE | 36 29 403 A1 | 3/1988 |
| EP | 0 632 930 B1 | 7/1998 |

OTHER PUBLICATIONS

Paul Haeberli, "Matrix Operations For Image Processing", Nov. 1993, 4-pages.

* cited by examiner

*Primary Examiner*—Tuan Ho
*Assistant Examiner*—Timothy J. Henn
(74) *Attorney, Agent, or Firm*—Harness, Dickey & Pierce, P.L.C.

(57) ABSTRACT

A method for the transformation of image signals that have been obtained by color filtering and have been logarithmically compressed is proposed. The color saturation of the recorded images is increased thereby. According to one aspect of the invention, the transformed image signals are determined as a function of the logarithmically compressed image signals and the logarithmically compressed brightness signals for a spectral color.

14 Claims, 7 Drawing Sheets

METHOD AND APPARATUS FOR MODIFYING THE COLOR SATURATION OF ELECTRONICALLY ACQUIRED IMAGES

CROSS-REFERENCES TO RELATED APPLICATIONS

This application is a continuation of copending international patent application PCT/EP00/12571 filed on Dec. 12, 2000 and designating the U.S., which claims priority from German patent applications DE 100 00 779.1, filed on Jan. 11, 2000.

BACKGROUND OF THE INVENTION

The invention relates to a method for the transformation of image signals that have been obtained by color filtering and have been logarithmically compressed, wherein the color saturation of the recorded images is modified. The invention furthermore relates to a saturation stage for carrying out the method and also to a digital camera having such a saturation stage.

In photographic and film camera technology, electronic image recorders, which convert an optical intensity distribution into electronic image signals, are increasingly being used as a replacement for conventional film material. Such image recorders have a regular arrangement of pixels which are each assigned one or more light-sensitive circuits comprising semi-conductor components, these circuits hereinafter being referred to as image cells. Each of these image cells generates an image signal whose voltage value is a function of the intensity of the light impinging on the image cell.

In image recorders for color reproduction, each pixel generally comprises a triad of image cells which are each covered by a color filter for one of the three spectral colors red, green and blue. Each signal of such an image cell reproduces a brightness value relative to the relevant spectral color, so that the totality of the three individual signals contains the color information for the relevant pixel.

If an image represented by such image signals is viewed directly on a monitor, then the result generally deviates more or less significantly from the actual visual impression gained by a person by directly viewing the recorded motif. Therefore, the image signals are generally digitized and, in digital signal processors, subjected to different transformations in order to adapt the recorded images to the actual visual impression.

Such transformations can be used for example to remove color casts (color transformations) or to brighten or darken recorded images overall (brightness transformations). Furthermore, it is possible to modify the color saturation of such electronic images. The saturation of a color is understood here as the difference between the color value and a grey-scale value of the same brightness. Weakly saturated colors are therefore pale or even greyish, while strongly saturated colors have a powerful and brilliant effect.

The description of such transformations is usually based on the so-called RGB color model, since this largely corresponds to the method of operation of image recorders and color monitors. This is because both in the RGB color model and in image recorders and color monitors colors are reproduced by components of the three spectral colors red, green and blue, which can each assume values between 0 and 1 in the color model. In this way, the totality of the representable colors can be represented in a unit cube spanned by a coordinate system on whose axes the three color components are plotted. If the components of the three primary colors have the same magnitude, which corresponds to a point on a spatial diagonal of the unit cube, then a pure grey-scale value is obtained. In the case of a weakly saturated color, the point representing this color lies in the vicinity of this spatial diagonal, i.e. the components of the spectral colors deviate only slightly from one another.

A transformation for the saturation of RGB colors is known from a paper by Paul Haeberli from 1993, which was published on the Internet under the address http://wwp.sqi-.com/graphica/matrix/index.html. If R designates an image signal for the spectral color red at a specific pixel, then the transformed image signal R' is produced, after the transformation described there, from the equation $$R' = \alpha \cdot (R-L) + L,$$

where L designates a brightness value for the relevant pixel and $\alpha$ designates a saturation factor. Corresponding equations apply with regard to the transformed image signals G' and B' for the spectral color green and blue, respectively, the saturation factor $\alpha$ and the brightness value L being identical for all the spectral colors of a pixel. In this case, the brightness value L is determined according to the equation $$L = R \cdot W_R + G \cdot W_G + B \cdot W_B$$

where
  $W_R = 0.3086$,
  $W_G = 0.6094$ and
  $W_B = 0.0820$.

If the saturation factor $\alpha$ is chosen to be less than 1, then this leads to a reduction of the color saturation. Saturation factors $\alpha$ which are greater than 1 produce more strongly saturated colors.

The paper furthermore points out that this transformation leads to correct results only when the image signals R, G and B are linear. Linear image signals are distinguished by the fact that there is a linear relationship between the voltage value of such an image signal and the optical intensity which impinges on the relevant pixel. This is the case for example with the image recorders using CCD technology (CCD=charge coupled device) that are often used in today video cameras. By contrast, if linear image signals are not involved, then according to Haeberli these signals must first be converted into linear signals before it is possible to carry out the above-described transformation for altering the color saturation.

EP 0 632 930 B1 discloses an image recorder which compresses a high input signal dynamic range logarithmically to a considerably smaller output signal dynamic range. Each pixel of this known image recorder thus generates an output voltage which corresponds to the logarithm of the optical intensity impinging thereon. As a result, the extremely high irradiance dynamic range of natural scenes, which is of the order of magnitude of 120 dB, can be acquired by signal technological means. Such an image recorder can thus be used to electronically acquire images whose brightness dynamic range comes extremely close to the actual visual perception of humans. This is primarily due to the fact that the human eye also has an approximately logarithmic visual sensitivity.

While these logarithmically compressed image signals reproduce a brightness dynamic range of about 120 dB, the absolute differences between the image signals of the individual spectral colors are comparatively small, however. It has the result that the images recorded using the known image recorder often have an inadequate color saturation. It therefore appears to be possible to follow the suggestion made in the paper by P. Haeberli cited above and firstly to linearize again the logarithmically compressed image signals after digitization, then to transform them in the manner described there and subsequently to logarithmize them again. However, such linearization (i.e. delogarithmization) and subsequent logarithmization of the image signals is highly complex computationally and can therefore be achieved only with expensive digital signal processors.

SUMMARY OF THE INVENTION

It is therefore an object of the invention to specify a method of the type mentioned in the introduction which allows modification of the color saturation in a more simple manner.

It is particularly an object of the invention to specify a simple and straight-forward method for modifying or enhancing the color saturation of image signals provided in a logarithmically compressed format.

It is furthermore an object of the invention to specify a saturation stage for modifying the color saturation of images in a simple and inexpensive manner, which can be used to transform image signals that have been obtained by color filtering and have been logarithmically compressed.

With a method as mentioned in the introduction, this object is achieved according to one aspect of the invention by virtue of the fact that the transformed image signals are determined as a function of the logarithmically compressed image signals and logarithmically compressed brightness signals at least for one spectral color.

With regard to a saturation stage, the object is achieved by means of a computer, which the transformed image signals can be determined with as a function of the logarithmically compressed image signals and logarithmically compressed brightness signals for at least one spectral color.

Contrary to the prejudice above, it has been found that a transformation carried out directly on the basis of logarithmically compressed image signals leads to outstanding results in the improvement of the color saturation. The only precondition for this is that logarithmically compressed brightness signals also enter into the transformation. The transformations which are known for linear image signals can thus essentially be adopted, to be precise surprisingly without corresponding logarithmization of the transformation equations. Thus, e.g. a computation operation for linear signals in which a linear signal S is multiplied by a factor k continues to be a multiplication by k (or a value k') in the case of a logarithmically compressed signal S'. In other words, the multiplication by k is not logarithmized, i.e. converted into an addition of log k.

For a specific pixel, the logarithmically compressed brightness signal can be provided for example by an additional image cell which receives color-unfiltered light and therefore supplies a pure brightness signal for this pixel. It is equally possible, of course, to determine the logarithmically compressed brightness signal for the relevant pixel using the logarithmically compressed image signals—if appropriate weighted in a suitable manner—for the three spectral colors. Moreover, it is possible to determine the brightness signal for a specific pixel also using image signals of one or more adjacent pixels.

It is particularly advantageous if the logarithmically compressed brightness signal for an individual pixel is equal to the arithmetic mean of the image signals of the relevant pixel which are assigned to the different spectral colors.

This determination of a brightness signal, which can be carried out very simply in terms of computation, leads to surprisingly good results in the modification of the color saturation if, according to the invention, there enter into the transformation directly logarithmically compressed image signals and logarithmically compressed brightness signals. The mean value can also be formed in an analogue manner, i.e. prior to digitization of the image signals, which allows the use of purely analogue circuit components.

In a preferred refinement of the invention, the transformed image signals $L'_c$ are determined from the image signals $L_c$ for the at least one spectral color c according to the equation $$L_c' = \alpha_c \cdot (L_c - L) + L$$

where $\alpha_c$ is a saturation factor for the spectral color c and L is a logarithmically compressed brightness signal.

In this case, the difference between the image signal $L_c$ of a spectral color and the brightness value L at the relevant pixel represents the actual color component which is amplified by the saturation factor $\alpha_c$, provided that $\alpha_c$ is chosen to be greater than 1. In contrast to known transformations, in which the saturation factor is identical for all the spectral colors, in this refinement of the invention it is also possible to choose different saturation factors $\alpha_c$ for the individual spectral colors c. In this way, the color saturation can be increased in a targeted manner such that it is possible to obtain an extremely realistic image impression corresponding to normal visual customs.

Provided that the gain factors $\alpha_c$ for the spectral colors c are constant, the above transformation is a linear transformation, which can be carried out in a particularly simple manner in terms of computation.

However, an increase in the color saturation which is even more true to reality can be obtained in many cases when the saturation factors $\alpha_c$ are dependent on a contrast factor $\gamma$ by which the logarithmically compressed image signals are multiplied before the transformation in the context of a $\gamma$ correction.

The $\gamma$ correction which is known per se and corresponds to an exponential operation with a contrast factor $\gamma$ in the case of linear image signals is manifested as multiplication by the contrast factor $\gamma$ in the case of logarithmic image signals. In the case of logarithmic image signals, too, the $\gamma$ correction leads to a change in the contrast, i.e. in the absolute brightness difference between two adjacent pixels. This also affects the color saturation, so that in many cases an adaptation of the saturation factors to the value of the gain leads to better results.

In this case, it is particularly preferred if the saturation factors $\alpha_c$ decrease as the contrast factor $\gamma$ increases.

This is because a higher gain and thus a higher contrast lead to a reduced brightness dynamic range and therefore also require a lower color saturation gain.

In an advantageous refinement of the invention, it is preferred for the relationship between the saturation factors $\alpha_c$ and the contrast factor $\gamma$ to be described by a piecewise linear and monotonically falling function.

In this way, a very good adaptation of the color saturation to the gain can be performed in a computationally simple manner.

As an alternative or else in addition to a dependence on a gain factor, the saturation factors $\alpha_c$ may be dependent on the logarithmically compressed brightness signals.

This takes account of the fact that the visual perception of humans can scarcely still make out color differences in the dark, so that it is possible to dispense with increasing the color saturation in this case. In the case of high brightness, on the other hand, colors are increasingly perceived as paler, which is why it is all the more important to increase the color saturation in that case. Therefore, the saturation factor $\alpha_c$ for a specific pixel is preferably a monotonically increasing function of the logarithmically compressed brightness signal determined for this pixel.

In this case, it is particularly preferred if the saturation factors $\alpha_c$ are proportional to the logarithmically compressed brightness signals.

As a result, the gain of the color saturation can be adapted very well to the brightness in a computationally simple manner.

It is to be understood that the features mentioned above and those yet to be explained below can be used not only in the combination respectively specified but also in other combinations or by themselves, without departing from the scope of the present invention.

BRIEF DESCRIPTION OF THE DRAWINGS

Further features and advantages of the invention emerge from the description of the following exemplary embodiments with reference to the drawing.

DETAILED DESCRIPTION OF PREFERRED EMBODIMENTS

Figure 1:
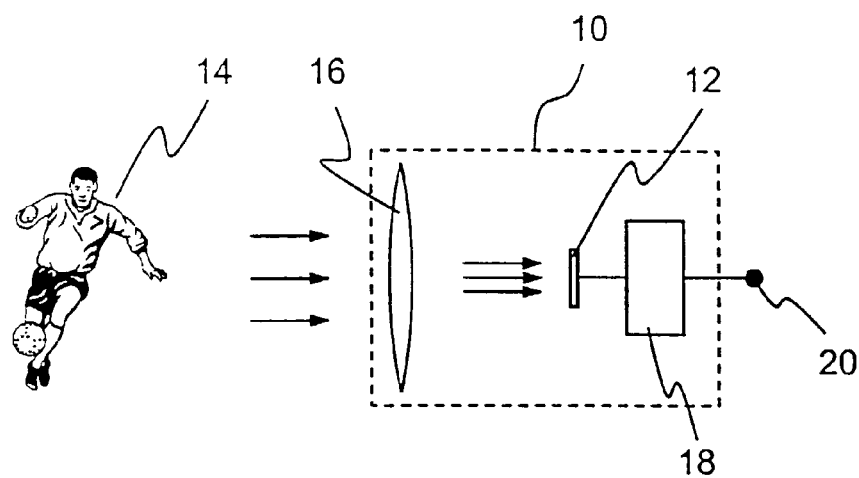
FIG. 1 shows a strongly diagrammatic illustration of a camera with an image recorder incorporated therein.

FIG. 1 shows a strongly simplified diagrammatic illustration of a digital camera 10, which may be a photographic or film camera. The digital camera 10 has an electronic image recorder 12, on whose light-sensitive surface a motif 14 is imaged with the aid of a lens system 16, which is only indicated here. In an electronic unit 18, the images recorded by the image recorder 12 are digitally processed further, so that they can finally be read out via a camera output 20. The electronic unit 18 can be assigned an image memory—not illustrated in FIG. 1—in which the conditioned images can be stored. Moreover, it is possible to arrange only part of the electronic unit 18 within the digital camera 10. The remaining parts are then realized outside the digital camera 10, e.g. as software which can be executed on a personal computer.

Figure 2:
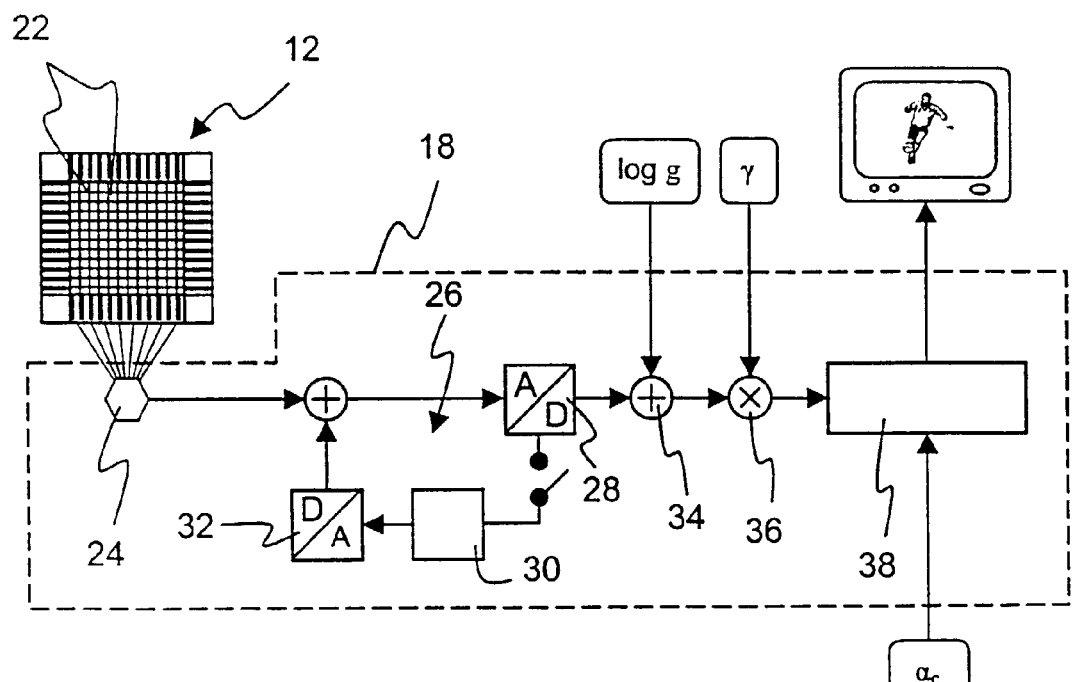
FIG. 2 shows a basic circuit diagram of an electronic unit for the further processing of image signals which have been generated by the image recorder illustrated in FIG. 1.

FIG. 2 illustrates the image recorder 12 and also the electronic unit 18 with further details. The image recorder 12 has a regular arrangement of pixels 22 which, in a manner known per se, in each case have three light-sensitive image cells which are covered by different color filters. Each image cell of a pixel generates an output voltage which is a function of the intensity of the light of that spectral color which can pass through the filter assigned to this image cell. Consequently, three mutually independent image signals are generated in each pixel 22, which image signals are respectively assigned to one of the three spectral colors red, green and blue. In this case, the image cells used in the image recorder 12 are realized as circuits of semiconductor components in which the functional relationship between the output voltage and the intensity of the impinging light is logarithmic. The image cells therefore generate logarithmically compressed image signals. Details on the construction of such image cells can be gathered from above mentioned EP-B-0 632 930, which is incorporated by reference herewith.

The image signals generated at the pixels 22 are read out row by row and column by column and combined in a multiplexer 24 to form an overall signal. The overall signal thus contains, in temporal sequence, the image signals assigned to the individual pixels 22. Therefore, hereinafter explanations concerning image signals also always relate to the corresponding overall signal, and vice versa, unless the context reveals something different.

The overall signal is subsequently conditioned in an offset circuit 26 in such a way that fluctuations in the properties of the individual image cells, in particular the threshold voltages of the phototransistors contained therein, are compensated for. In this operation, which is also referred to as white balancing and only needs to be carried out a single time, the overall signal is firstly digitized in a first analogue/digital converter 28, a uniform color area, e.g. a white area, being chosen as the motif to be recorded. This image, an inverted image or a differential image is stored in a memory 30, so that it is always available during the subsequent recordings. The image stored in the memory 30 is then converted back into an analogue signal in a digital/analogue converter 32 and superposed on the analogue overall signal originating from the multiplexer 24.

The brightness of the overall signal balanced in the offset circuit 26 is then regulated. This is done by addition of the value log g in an adder 34. The addition of the value log g corresponds to the amplification of the overall signal by the factor g, which effects the adaptation of the brightness in linear image recorders, e.g. CCD sensors.

The amplified overall signal is subsequently subjected to a γ correction, by means of which, inter alia, the contrast of the recorded image is modified or distortions of the image signals are equalized. The γ correction which is realized by an exponential operation in a linear signal space is manifested as simple multiplication by the contrast factor γ in a logarithmic image signal space. The multiplier 36 provided for this purpose can therefore be embodied as a simple bit shifter if the values that can be assumed by the contrast factor γ are limited to powers of two.

The amplified and corrected overall signal is subsequently fed to a saturation stage 38, in which the color saturation of the recorded image can be modified, in particular increased, in a targeted manner. For this purpose, saturation factors $\alpha_c$ can be fed to the saturation stage 38 by a control unit or directly by a user, which saturation factors define the way in which the color saturation is modified in the saturation stage 38.

The transformation of the overall signal which is performed in the saturation stage 38 is explained in more detail below with reference to FIGS. 3 to 7.

Figure 3:
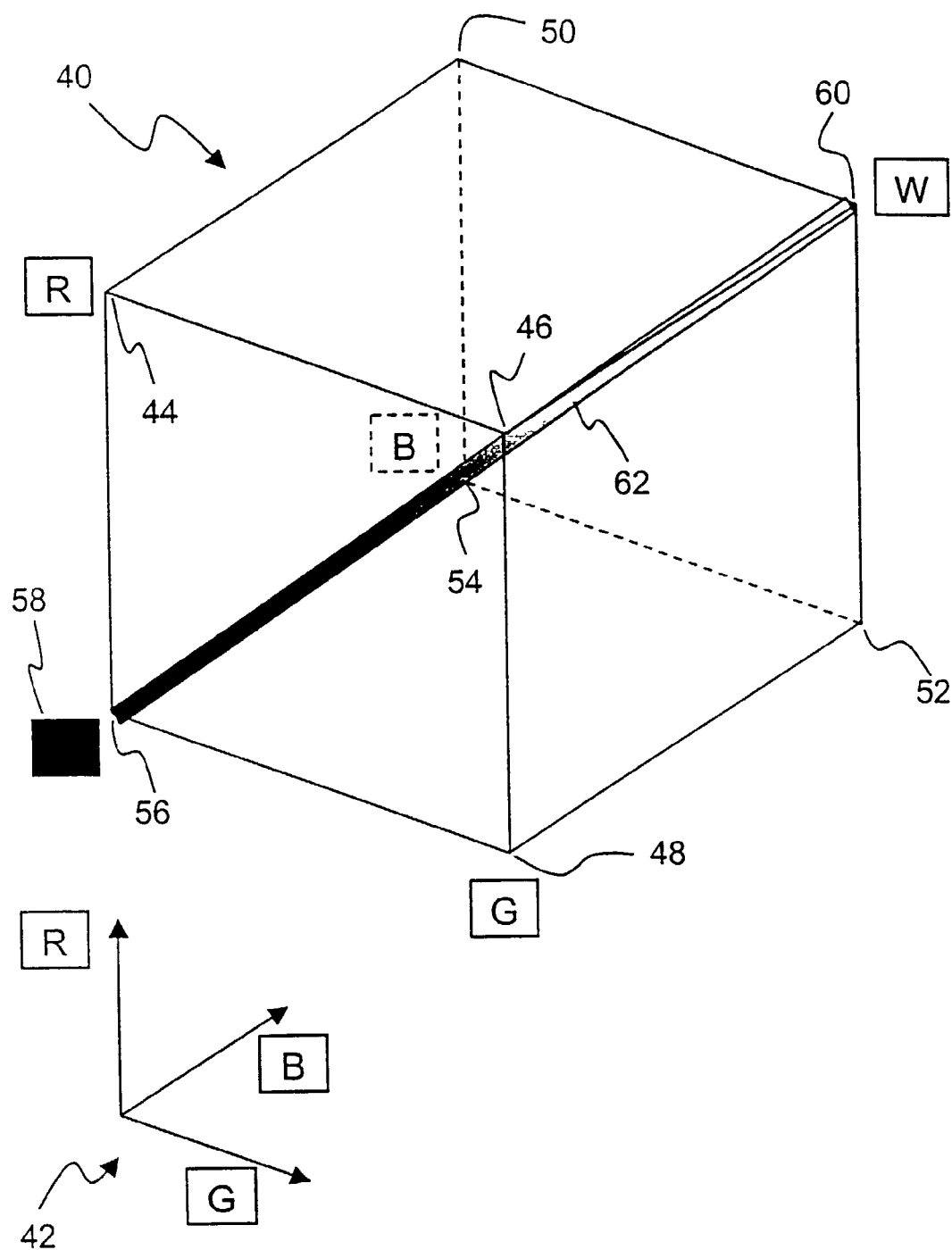
FIG. 3 shows a color cube for elucidating the RGB color model.

FIG. 3, which serves merely for elucidating the RGB color model, shows a color cube 40, which is used for representing colors in this model. The color cube 40 is spanned by a tripod 42 illustrated with a reduced size below the color cube 40. The tripod 42 defines a coordinate system on whose axes are plotted the color components for the spectral colors red, green and blue. Upper-case letters R, G and B, respectively, enclosed in a box serve for designating the spectral colors in the drawing. Each color can be represented by a mixing of these three spectral colors red, green and blue, the hue being defined by the ratio of the components of these three spectral colors and the brightness being defined by the absolute values. The components can each assume values between 0 and 1, so that each color is reproduced by a point in the color cube 40.

The corner of the color cube 40 which is designated by 44 corresponds e.g. to a pure red of maximum brightness, since the color components for the spectral colors green and blue are zero in each case. The point reproduced by the corner 46 of the color cube 40 represents the color yellow of maximum brightness, since, at this point, the color component of the colors red and green is 1 in each case, which leads to the mixed color yellow. The corner 48 corresponds to the color green, the corner 50 to the color magenta, the corner 52 to the color cyan and the corner 54 to the color blue.

In the corner 56 of the color cube 40, which forms the origin of the tripod 42, the color components are 0 in each case. This corresponds to the color black, which is indicated by the black quadrangle 58 in FIG. 3. The spatial-diagonally opposite corner 60 is characterized in that there the components of the three spectral colors red, green and blue are 1 in each case. This maximum color value leads to the mixed color white which is indicated by the letter W enclosed in a box. The points lying on the spatial diagonal between corners 56 and 60 are distinguished by the fact that the color components are in each case identical there as well. Consequently, the spatial diagonal 62 represents all grey-scale values whose brightness increases continuously from the corner 56 (black) to the opposite corner 60 (white). In FIG. 3, said spatial diagonal is designated by 62 and is illustrated in a widened fashion in order to be able to represent the grey-scale values.

Figure 4:
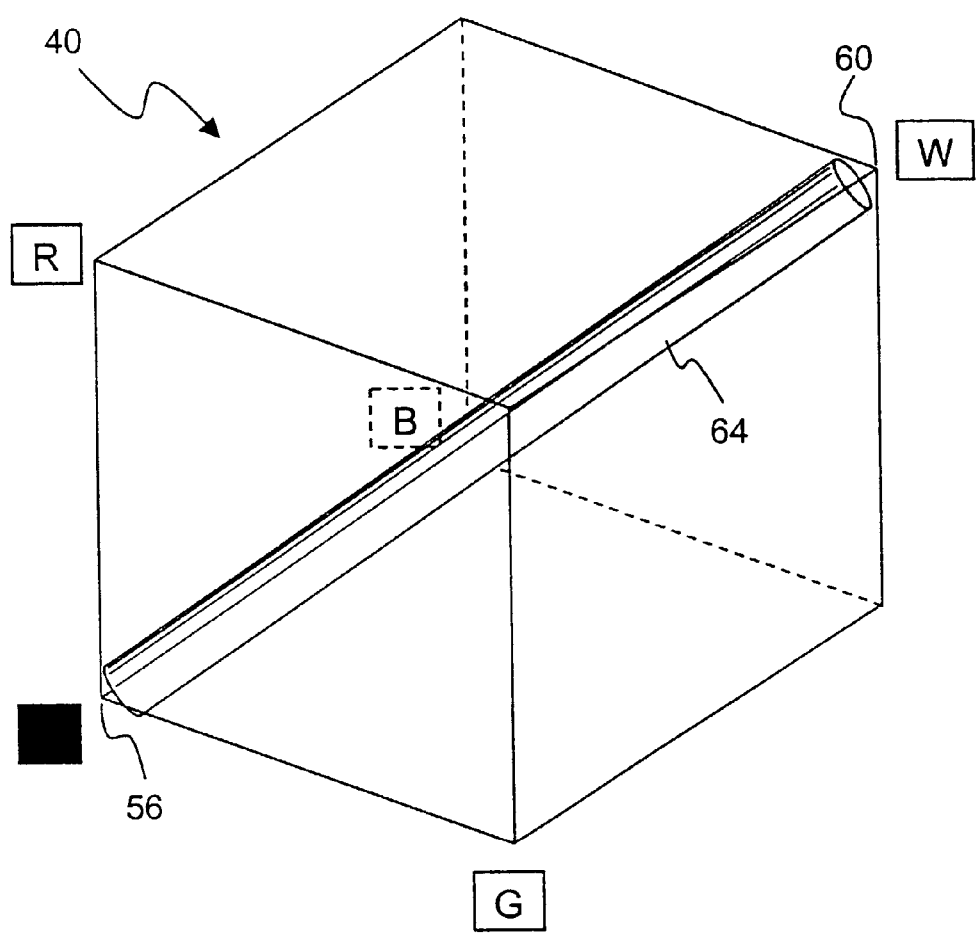
FIG. 4 shows a diagrammatic illustration of the range of values of untransformed image signals in the color cube.

FIG. 4 shows the color cube 40 from FIG. 3, the illustration depicting, instead of the spatial diagonal 62, a cylinder 64 arranged concentrically with respect thereto. The cylinder 64 indicates the range of values which can be assumed by the image signals before they are subjected to the transformation according to the invention in order to increase the color saturation in the saturation stage 38. The cylinder 64 arranged concentrically with respect to the spatial diagonal 62 makes it clear that the color values reproduced by the image signals are relatively close together, i.e. are situated in proximity to the spatial diagonal 62. This means that the recorded images are relatively greyish, i.e. have a low color saturation.

Figure 5:
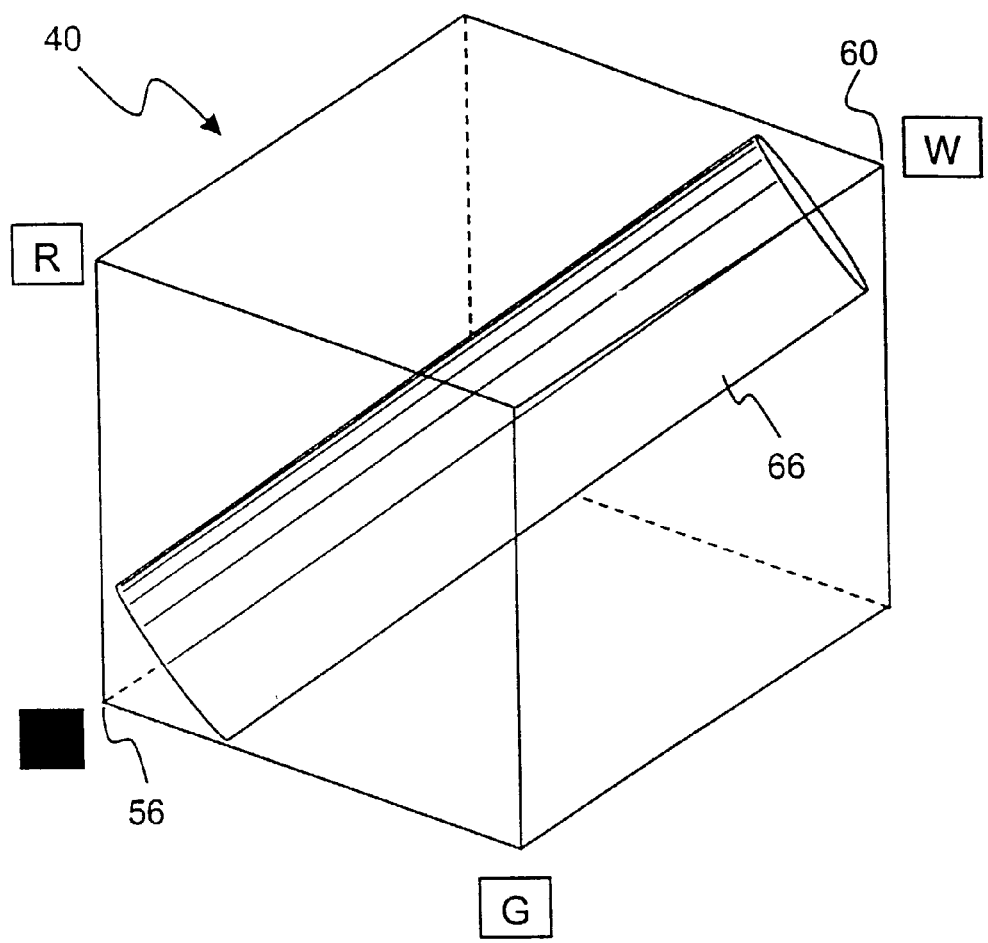
FIG. 5 shows a diagrammatic illustration of the range of values of transformed image signals in the color cube, the saturation factors not depending on the brightness.

FIG. 5 likewise shows a color cube 40, in which a different cylinder 66 is depicted concentrically with respect to the spatial diagonal between the corners 56 and 60. The cylinder 66 reproduces the range of values of the transformed image signals. As is directly discernible from this diagrammatic illustration, the transformed image signals can assume a significantly larger range of values within the color cube 40. The color values have on average a greater distance from the spatial diagonal—reproducing the grey-scale values—between the corners 56 and 60, which corresponds to a higher color saturation.

The transformed image signals R', G' and B' for the colors red, green and blue, respectively, are in this case derived according to the transformation equations $$R'=\alpha_R \cdot (R-L)+L$$

$$G'=\alpha_G \cdot (G-L)+L$$

$$B'=\alpha_B \cdot (B-L)+L$$

from the logarithmically compressed image signals R, G and B, for which the following proportionality holds true:

$$R \sim \gamma(\log I_R + \log g)$$

$$G \sim \gamma(\log I_G + \log g)$$

$$B \sim \gamma(\log I_B + \log g)$$

In this case, g designates the gain factor whose logarithm was added to the image signals in the adder 34. The quantities $I_R$, $I_G$ and $I_B$ are the spectrally filtered irradiances which occur at the individual image cells of a pixel.

The brightness signals L are determined for each individual pixel by forming the arithmetic means of the image signals assigned to the individual spectral colors, i.e. the following holds true for the brightness signal L:

$$L = \frac{1}{3} \cdot (R + G + B).$$

In this case, a gain of the color saturation is produced only in the case of saturation factors which are greater than 1. If all the saturation factors $\alpha_R$, $\alpha_G$ and $\alpha_B$ are equal to 1, then the color saturation remains unchanged; on the other hand, if these saturation factors are less than 1, then the color saturation decreases until finally (all saturation factors=0) a pure grey-scale value image is produced.

In the case of the transformation indicated diagrammatically in FIG. 5, the saturation factors $\alpha_R$, $\alpha_G$ and $\alpha_B$ are identical, as a result of which the values for the transformed image signals lie within a circular cylinder. If these saturation factors are chosen differently, then this leads to cylinders with elliptical base areas. The choice of the saturation factors $\alpha_R$, $\alpha_G$ and $\alpha_B$ thus makes it possible, when increasing the color saturation, to generate additional color accentuations which enable the recorded images to be adapted even better to the actual visual impression.

Moreover, in the case of the transformation shown in FIG. 5, the saturation factors $\alpha_R$, $\alpha_G$ and $\alpha_B$ are constants which may be defined by a user of the digital camera 10, but do not depend on further variables. This means that the equations specified above for the transformed image signals R', G' and B' are linear. However, it is equally possible to make the saturation factors $\alpha_R$, $\alpha_G$ and $\alpha_B$ functionally dependent on other variables.

Figure 6:
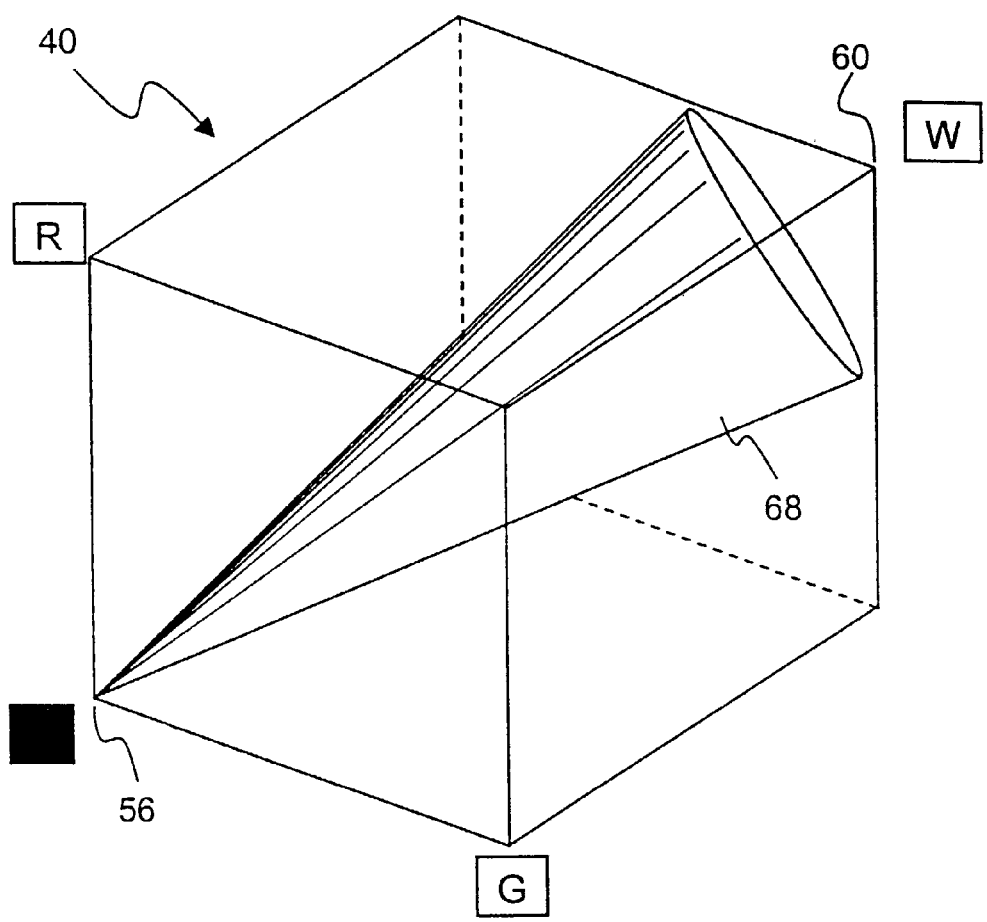
FIG. 6 shows a diagrammatic illustration of the range of values of transformed image signals in the color cube, the saturation factors depending on the brightness.

FIG. 6 shows a color cube 40 in which a frustum 68 is depicted concentrically with respect to the spatial diagonal between the corners 56 and 60, the vertex of the frustum 68 coinciding with the corner 56. The frustum 68 reproduces the range of values of a transformation in which the saturation factors $\alpha_R$, $\alpha_G$ and $\alpha_B$ are a function of the brightness, so that $$\alpha_R = \alpha_R(L)$$

$$\alpha_G = \alpha_G(L)$$

$$\alpha_B = \alpha_B(L)$$

As a result of the introduction of brightness-dependent saturation factors, the transformation equations specified above are thus no longer linear with respect to the brightness signal L.

In the exemplary embodiment illustrated in FIG. 6, the relationship between the saturation factors $\alpha_R$, $\alpha_G$ and $\alpha_B$ and the brightness L is linear, i.e.

$$\alpha_R = k_R \cdot L$$

$$\alpha_G = k_G \cdot L$$

$$\alpha_B = k_B \cdot L$$

where $k_R$, $k_G$ and $k_B$ are positive proportionality constants. If the proportionality constants $k_R$, $k_G$ and $k_B$ are identical, the base area of the frustum is a circular area. This transformation with brightness-dependent saturation factors has the result that the saturation is increased to a greater extent, the higher the brightness at the relevant pixel. At low brightness, on the other hand, the color saturation is reduced and finally disappears completely for a brightness of L=0. In many cases, this transformation leads to a particularly natural image impression since color differences can hardly be made out anyway in dark image regions and for this reason the color saturation is even reduced there. On the other hand, bright regions often appear unnaturally pale, which is why the color saturation is raised to a particularly great extent there.

It is understood that FIGS. 4, 5 and 6 are merely diagrammatic in nature and the cylinders 64 and 66 illustrated there as well as the frustum 68 do not represent an exact reproduction of the range of values of the transformed image signals. In particular, for illustration reasons, the base areas of the cylinders and of the frustum are drawn within the color cube 40. In reality, however, at least the corners 60 or points situated in the vicinity thereof lie within the range of values since it must be ensured, of course, that the color white is also represented correctly. Conversely, it is also possible, of course, for the range of values of the transformed image signals not to lie outside the color cube 40. During the programming of the transformation, that is taken into account by additional normalization functions which need not be presented in detail here.

Figure 7:
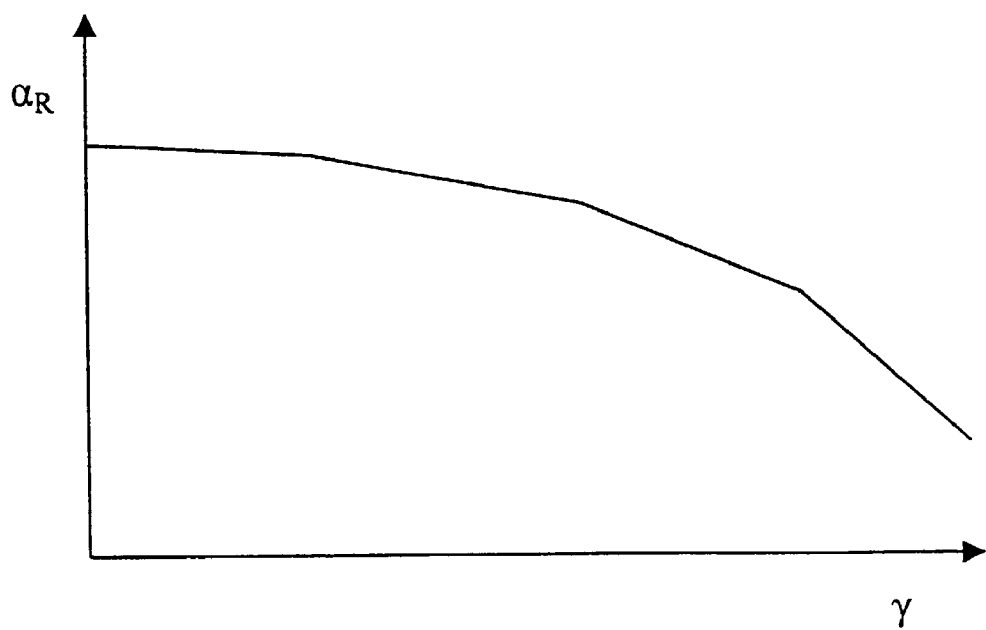
FIG. 7 shows a graph in which a saturation factor is plotted against a gain factor.

In addition or as an alternative to a dependence on the brightness values L, the saturation factors $\alpha_R$, $\alpha_G$ and $\alpha_B$ may also have a dependence on the contrast factor γ by which the overall signal is multiplied in the multiplier 36 prior to the transformation. FIG. 7 shows a graph in which, by way of example, the saturation factor $\alpha_R$ for the color red is plotted against the contrast factor γ. The functional relationship between these two quantities is described by a monotonically falling and piecewise linear function. The contrast factor γ, whose value generally depends on the dynamic range of the image that is to be represented and can therefore change from image to image, is generally larger, the smaller the dynamic range of the recorded image. High contrast factors γ mean that the image overall gains in contrast and, as a result, the color saturation perceived by the viewer also increases. This fact is taken into account by the saturation factors $\alpha_R$, $\alpha_G$ and $\alpha_B$ decreasing as the gain increases in the manner illustrated in FIG. 7. A piecewise linear function leads to shorter computation times, but can equally, of course, be replaced by a different functional relationship.

Figure 8:
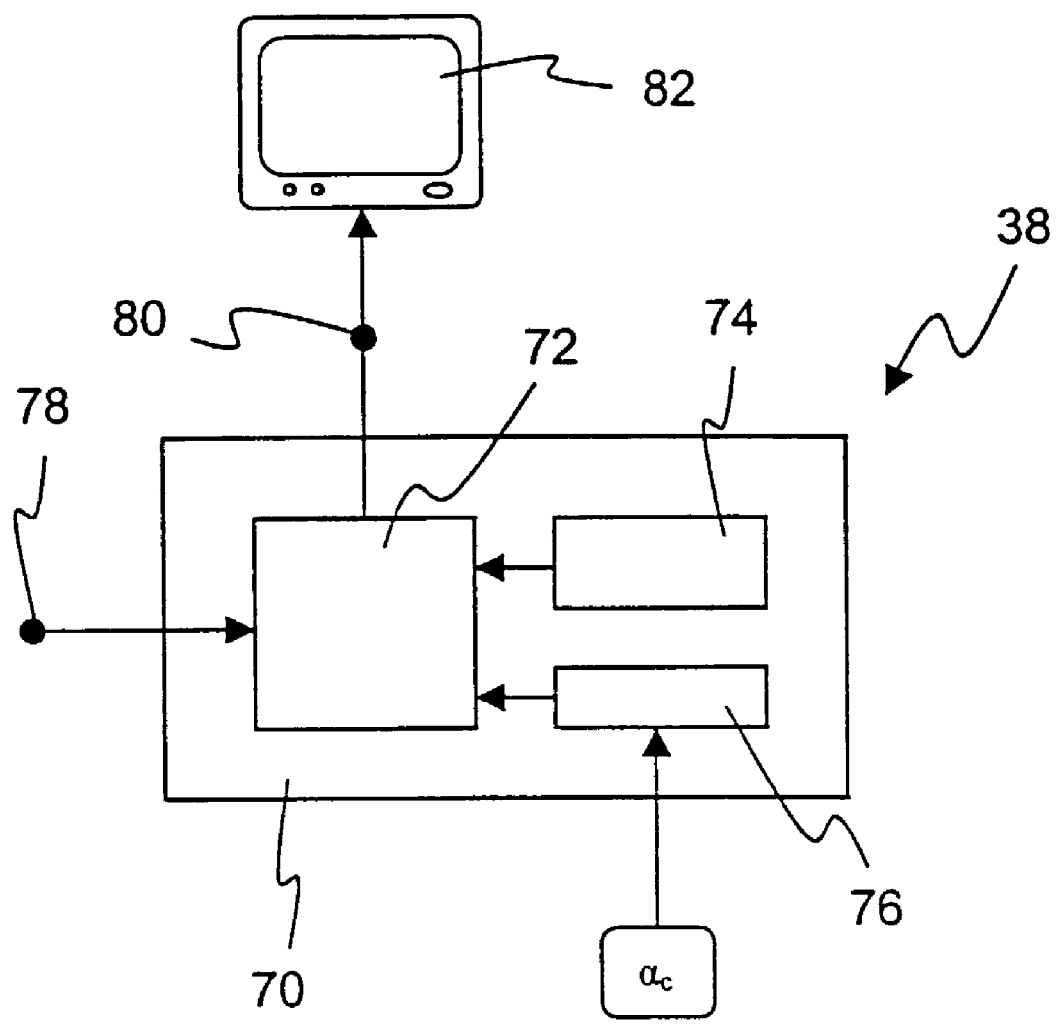
FIG. 8 shows a strongly diagrammatic illustration of a saturation device for carrying out the transformation according to the invention.

FIG. 8 shows the construction of a saturation stage 38 in a strongly simplified manner. The saturation stage 38 is embodied as a digital signal processor 70, which comprises a computing unit 72 and also a freely programmable ROM program memory 74. A computer program which controls the performance of the transformation illustrated above in the computing unit 72 is stored in the program memory 74. The digital signal processor 70 additionally has a volatile memory 76, in which variables that can be modified by an operator, e.g. specifications with regard to the desired color saturation, can be stored. The digital signal processor 70 additionally has an input 78, via which a conditioned overall signal to be transformed can be fed in, and also an output 80 for outputting the transformed image signals, e.g. to a screen 82 or an image memory.

It is understood that the saturation stage 38 can also be realized in other ways. It may e.g. also be situated outside a digital camera and then be embodied, for instance, as a personal computer into which a program for electronic image processing is loaded, which program controls the performance of the transformation discussed above by the processor of the personal computer. Furthermore, the saturation stage may also be realized as a digital or analogue electronic circuit.

What is claimed is:

1. In a digital camera comprising an electronic image recorder for recording an overall image signal, said image recorder comprising a regular arrangement of pixels, each pixel having three light-sensitive image cells each covered by one of three different color filters, and each pixel thus generating three mutually independent image signals assigned to one of three colors, wherein said overall image signal comprises a color saturation, a method for modifying said color saturation, said method comprising the steps of:
   recording said mutually independent image signals in each of said pixels in a logarithmically compressed format,
   determining a logarithmically compressed brightness signal from said mutually independent image signals as an arithmetic mean of said mutually independent image signals,
   selecting at least one of said mutually independent image signals, and
   transforming said at least one independent image signal selected as a function of said logarithmically compressed brightness signal.

2. The method of claim 1, wherein said steps of selecting and transforming are executed for all mutually independent image signals of all pixels.

3. The method of claim 1, wherein said step of transforming is executed according to the equation $$L_c' = \alpha_c \cdot (L_c - L) + L$$

wherein $L_c'$ is the value of the transformed image signal for a color c, $L_c$ is the non-transformed independent image signal for the color c, $\alpha_c$ is a predefined saturation factor, and L is the logarithmically compressed brightness signal.

4. A method of modifying a color saturation in an overall image signal comprising mutually independent image signals assigned to one of three different colors, said method comprising the steps of:
   providing said mutually independent image signals in a logarithmically compressed format,
   determining a logarithmically compressed brightness signal from said mutually independent image signals,
   selecting the independent image signal of at least one color, and
   transforming said independent image signal selected as a function of said logarithmically compressed brightness signal.

5. The method of claim 4, wherein said logarithmically compressed brightness signal is determined as an arithmetic mean of said mutually independent image signals of the pixel.

6. The method of claim 4, wherein said step of transforming is executed according to the equation $$L_c' = \alpha_c \cdot (L_c - L) + L$$

wherein $L'_c$ is the value of the transformed image signal for a color c, $L_c$ is the non-transformed independent image signal for the color c, $\alpha_c$ is a predefined saturation factor, and L is the logarithmically compressed brightness signal.

7. The method of claim 6, wherein said saturation factor $\alpha_c$ is selected in dependence on a contrast factor $\gamma$ by which, in the context of a $\gamma$ correction step, the logarithmically compressed image signals are multiplied before the transformation step.

8. The method of claim 7, wherein said saturation factor $\alpha_c$ decreases as said contrast factor $\gamma$ increases.

9. The method of claim 8, wherein said saturation factor $\alpha_c$ is selected on the basis of a piecewise linear and monotonically falling function describing the relationship between said saturation factor $\alpha_c$ and said contrast factor $\gamma$.

10. The method of claim 6, wherein said saturation factor $\alpha_c$ is selected depending on said logarithmically compressed brightness signal.

11. The method of claim 10, wherein said saturation factor $\alpha_c$ is selected proportional to said logarithmically compressed brightness signal.

12. A digital camera comprising:
   an electronic image recorder for recording an overall image signal having a color saturation, said image recorder comprising a regular arrangement of pixels, each pixel having three light-sensitive image cells covered by one of three different color filters, and each pixel thus generating three mutually independent image signals assigned to one of three colors, said pixels generating said mutually independent image signals in a logarithmically compressed format, and
   a saturation stage for modifying said color saturation, said saturation stage comprising a digital signal processor adapted to execute a method comprising the steps of:
      determining a logarithmically compressed brightness signal from said mutually independent image signals,
      selecting the independent image signal for at least one color, and
      transforming said independent image signal selected as a function of said logarithmically compressed brightness signal.

13. A saturation stage for modifying a color saturation of an overall image signal comprising logarithmically compressed and mutually independent image signals assigned to one of three different colors, said saturation stage comprising a computer adapted to execute a method comprising the steps of:
   determining a logarithmically compressed brightness signal from said mutually independent image signals,
   selecting the logarithmically compressed independent image signal for at least one color, and
   transforming said logarithmically compressed independent image signal determined as a function of said logarithmically compressed brightness signal.

14. The saturation stage of claim 13, wherein said computer is programmed to execute said step of transforming according to the equation $$L_c' = \alpha_c \cdot (L_c - L) + L$$

wherein $L'_c$ is the value of the transformed image signal for a color c, $L_c$ is the non-transformed independent image signal for the color c, $\alpha_c$ is a predefined saturation factor, and L is the logarithmically compressed brightness signal.

* * * * *